C. B. THORNE.
LOG BARKER AND THE LIKE.
APPLICATION FILED MAR. 29, 1919.

1,319,935.

Patented Oct. 28, 1919.
4 SHEETS—SHEET 1.

INVENTOR
C. B. Thorne
BY
ATTY.

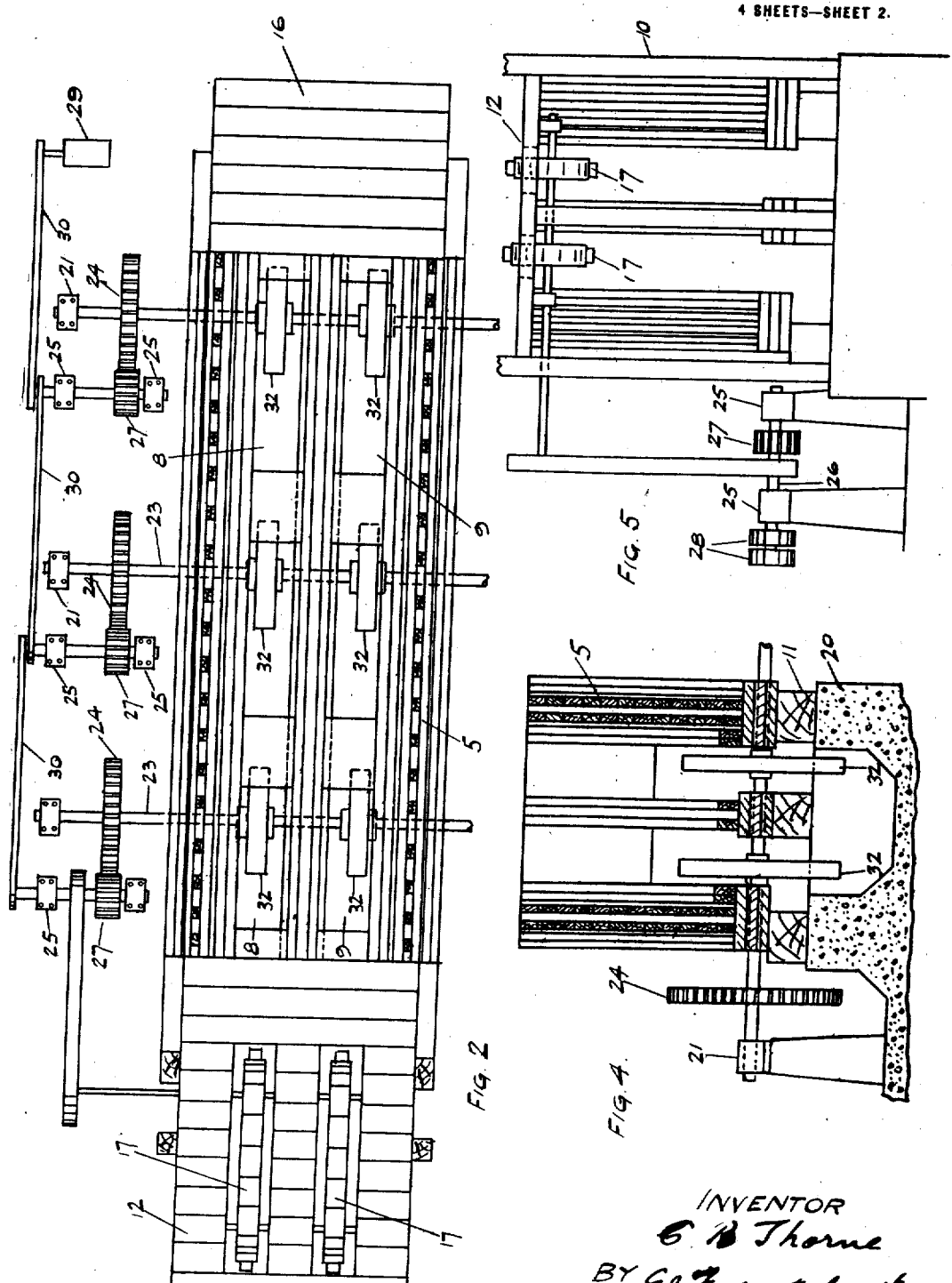

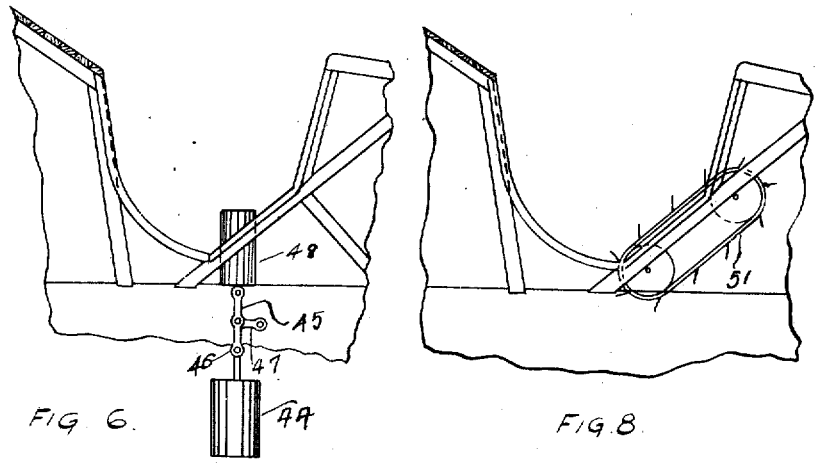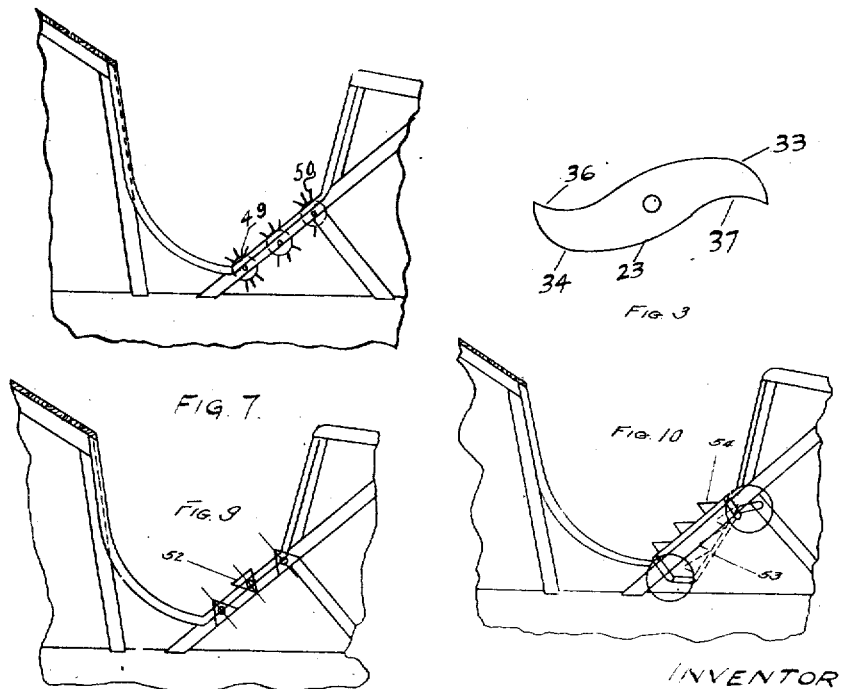

C. B. THORNE.
LOG BARKER AND THE LIKE.
APPLICATION FILED MAR. 29, 1919.
1,319,935.
Patented Oct. 28, 1919.
4 SHEETS—SHEET 4.
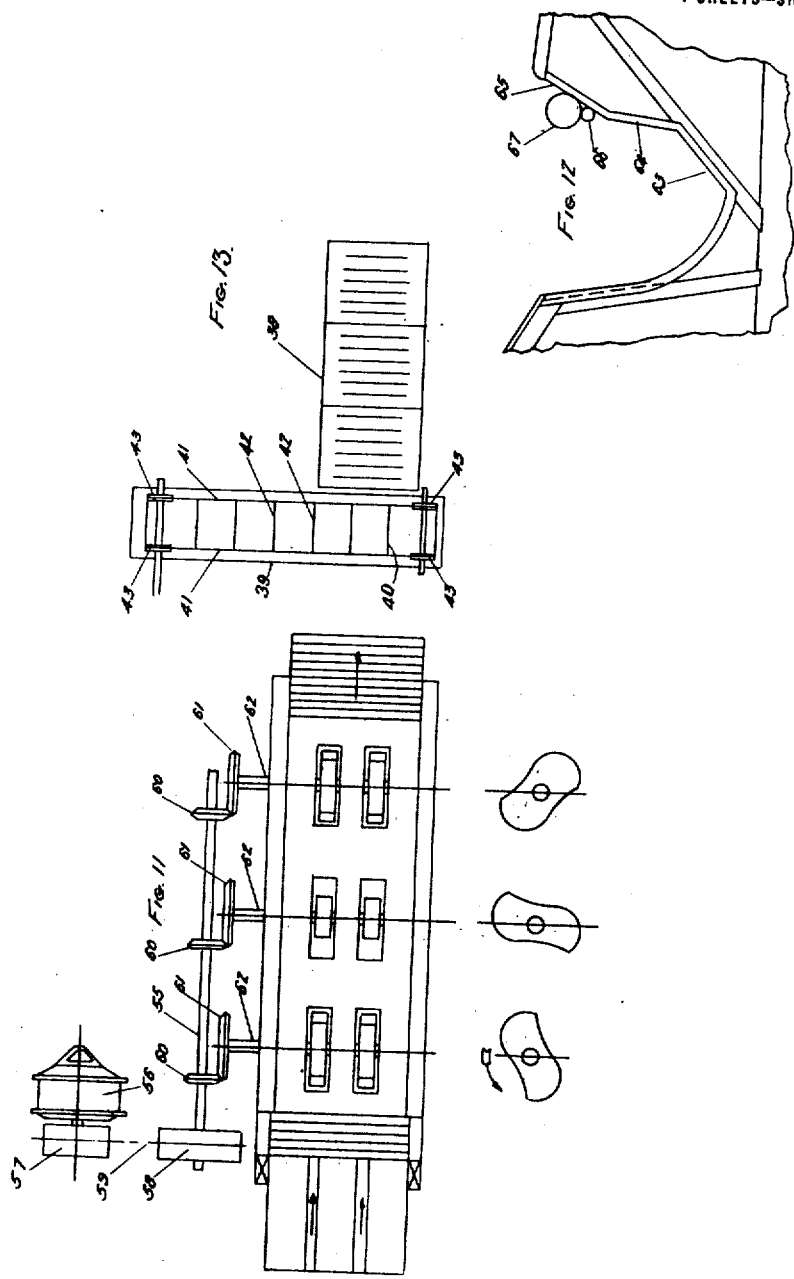

UNITED STATES PATENT OFFICE.

CARL BUSCH THORNE, OF HAWKESBURY, ONTARIO, CANADA.

LOG-BARKER AND THE LIKE.

1,319,935. Specification of Letters Patent. Patented Oct. 28, 1919.

Application filed March 29, 1919. Serial No. 286,138.

*To all whom it may concern:*

Be it known that I, CARL BUSCH THORNE, a subject of the King of Norway, and residing at the town of Hawkesbury, in the Province of Ontario, in the Dominion of Canada, have invented a new and useful Log-Barker and the like, of which the following is the specification.

The invention relates to log barkers and the like as described in the present specification and illustrated in the accompanying drawings that form part of the same.

The invention consists essentially of the novel construction and arrangement of parts, whereby the logs are maintained continuously and variously in rolling contact by circulating them regularly in their progress through the machine.

The objects of the invention are to remove the bark from logs of any length without injury to the log or waste of good wood; to simplify the methods of handling logs in barking operations; to efficiently strip the bark notwithstanding adverse climatic conditions; to economize in labor and power; and generally to provide a serviceable and durable machine at a moderate cost for barking, clearing logs of ice and washing logs and for any other use in which rubbing action is desirable.

In the drawings, Figure 1 is a side elevation of the machine showing hopper sides removed to disclose the movement of the logs in their circulation.

Fig. 2 is a plan view of the machine.

Fig. 3 is a detail of a cam.

Fig. 4 is an elevation of the machine at the delivery end.

Fig. 5 is an elevation of the machine at the feeding end.

Fig. 6 is a detail of a hopper showing another mechanism for creating the circulatory movement of the logs.

Fig. 7 is a detail of a hopper showing another modification.

Fig. 8 is a detail of a hopper showing another modification.

Fig. 9 is a detail of a hopper showing another modification.

Fig. 10 is a detail of a hopper showing another modification.

Fig. 11 is a plan view showing an alternative drive and the corresponding positions of the displacing cams.

Fig. 12 is a detail of a hopper showing a preferred form of rear wall.

Fig. 13 is a plan view of the bark draining trough and conveyer.

Like numerals of reference indicate corresponding parts in each figure.

Figure 1:
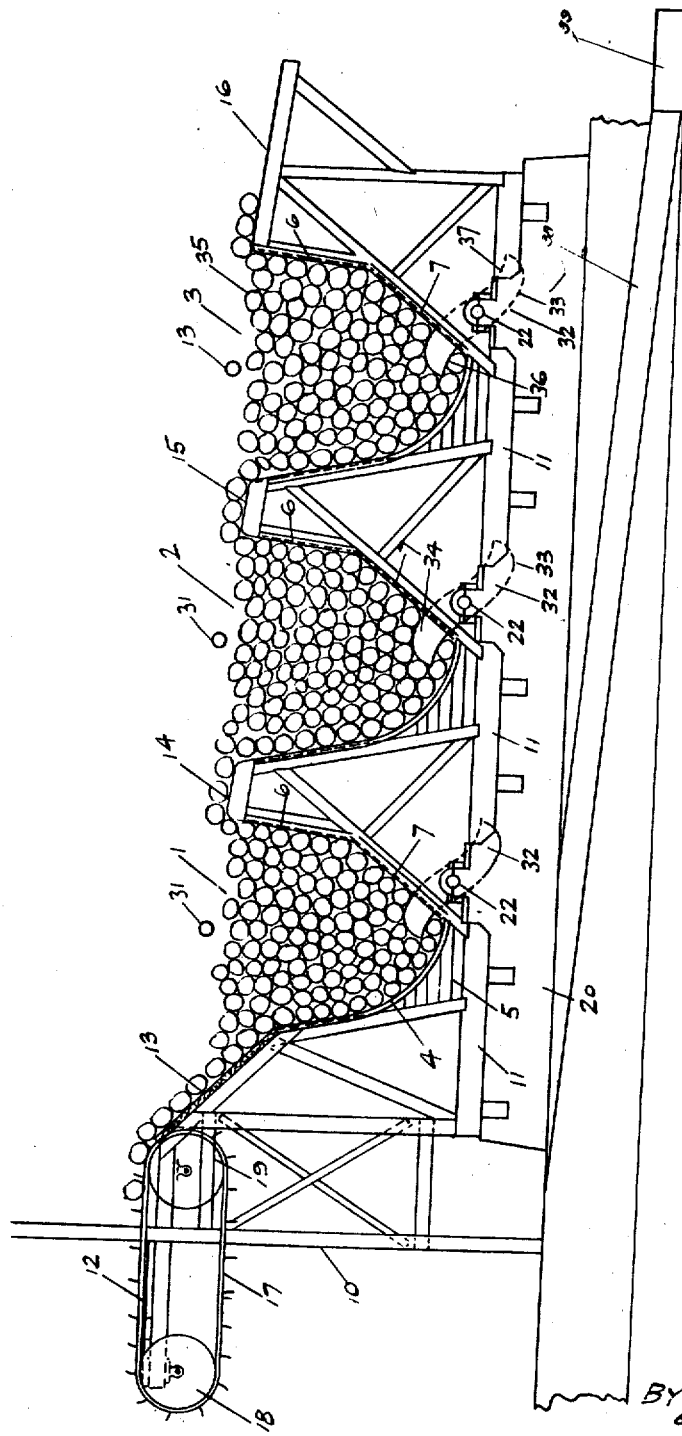

Referring to the drawings, the numerals 1, 2 and 3 indicate hoppers having the curved and sloping front walls 4 terminating at the side walls 5 and at their lower ends forming the bottoms of the hoppers, meeting the rear walls 6, which extend upwardly to the top of the side walls in a plurality of inclined sections, the lower and greater inclined sections 7 having the cam slots 8 and 9 registering with corresponding slots in the bottom portions of the front walls 4.

The said hoppers are made in any suitable number, in some cases only one is necessary, while in others the number of hoppers depends on the condition of the bark and consequently the difficulties it offers toward removal. These hoppers are preferably lined with boiler plate and constructed of timbers, steel or concrete and supported by the structure here shown in the vertical beams 10 and the longitudinal girders 11.

The said structure supports at the feed end the platform 12, which continues to the inclined way 13 and this leads into the hopper 1.

The inclined platform 14 is the connection between hopper 1 and hopper 2 and the inclined platform 15 is the connection between hoppers 2 and 3.

The runway 16 is the delivery platform and leads from the top of the rear wall of the hopper 3 and terminates the path of the log through the machine starting from the feed platform 12.

The endless chain carrier 17 carries the log along the platform 12 up to the inclined way 13.

The sprocket wheels 18 and 19 are journaled in suitable bearings supported by the structure and carry the chain 17.

The structure supporting the hoppers and operating machinery is constructed on the concrete bed 20. The bearings 21 are supported above the bed 20 and from the longitudinal girders and line up with the cam shaft bearings 22 secured to the hopper structure adjacent to the slots 8 and 9.

The cam shafts 23 are journaled in the bearings 21 and 22 and at their outer ends carry the gears 24, which are necessarily of considerable size to insure a regular and comparatively slow rotatory movement to each of said shafts.

The bearings 25 are suitably supported above the concrete bed and the pinion shafts 26 are journaled in said bearings, said shafts 26 carrying the pinions 27 coacting with the gears 24. The pulleys 28 are also fixedly mounted on the pinion shafts 26 and are operatively connected to the motor 29 by the belts 30.

The sprinkler pipes 31 are supported above each hopper and are connected to a suitable water supply.

The cams 32 are mounted on the cam shafts 23 and in turning enter the slots 8 and 9, said cam having a receding face 33 and 34 at the ends from the direction of rotation, so that in turning these faces 33 and 34 each engage the logs 35 and leave them to drop behind the cams, which are correspondingly recessed at 36 and 37.

The cam openings in the bottoms of the hoppers lead into a drain trough 38, which slopes downwardly in the direction of the delivery end of the machine and receives the water and bark from the hoppers.

At its lower end the trough 38 empties into the transverse trough 39, in which the scraping conveyer 40 operates, said conveyer being formed of the chains 41 carrying the scrapers 42 and turning with the sprockets 43, which are suitably driven. The bottom of the trough 38 is perforated, therefore the water is drained off and the bark conveyed to its delivery point for use as fuel or in the manufactures.

In the operation of this invention, the logs are first directed to the feed carrier and by means of this carrier deposited at or near the inclined way leading into the first hopper.

The logs fall down and as the hopper fills, the cams are covered in, but at each revolution they displace and roll several logs, in fact they continuously make place for the fall of a number of logs, thus creating a disturbance that brings the constantly feeding logs from behind the cams to a position thereabove, where their contact with said cam rolls them around, so that they rub hard against the logs immediately thereabove and at this point the most effective work in the operation is accomplished. The logs gradually work up and around so that there is a distinct circulation within each hopper, which appears to culminate centrally in each hopper, in the raising of one or more logs to the top from underneath at each stroke and these are usually well barked.

The number of hoppers may or may not depend on the condition of the logs, for it is safe to say, that to add to the number of hoppers means a considerable increase in the rubbing operations and therefore the efficiency is often increased, though on the other hand too many hoppers may injure the wood, therefore under some conditions the rubbing operations in each hopper may be lengthened and this can be done by delaying the feed. This construction materially facilitates the work of the attendant in adjusting operations to insure efficiency under varying conditions.

The main feature of the invention is the making of a hole or creating a space, into which the logs must fall, thereby causing a continuous movement among the logs, in other words, insuring a circulation that will bring every log at times in contact with the disturbing element and impart to said log the desired roll, which has so much to do with removing the bark.

As the disturbance of the logs, preferably at a given point, is essential to the operation of the machine it is obvious that this may be done by other mechanical means than the rotating cams hereinbefore described, as for instance, in Fig. 6 a reciprocatory machine is used in which 44 is a cylinder connected to a suitable supply of expansile fluid and having a piston therein connected with the rod 45 and cross head 46, the latter being connected to the oscillatory rod 47, which operates the pusher 48.

The pusher or pushers, as there may be more than one, engage the logs and accomplish the purpose for which the cams are used.

In Fig. 7 another displacing mechanism is shown and is similar in many ways to the cams described, for it consists of a succession of rotors 49, suitably driven, and having pins 50 or teeth or any projections, which will engage and lift the logs.

In Fig. 8 the toothed chain 51 is shown as extending through a slot in the lower section of the rear wall in a similar manner to the cam and forming the disturbing element and this carries the logs continuously from one corner of the hopper and at its upper ends drops them back into the middle of the hopper where they gradually work back to the carrier again.

In Fig. 9 a plurality of cams 52 triangular in cross section are shown, these being arranged preferably in sets of three and projecting through the first upward reach of the rear wall of a hopper.

In Fig. 10 a vibratory bar 53 is shown in the same upward reach of the rear wall, said bar having teeth 54 beveled forwardly from a straight back wall.

In Fig. 11 a modified form of drive is shown and in this a driven shaft 55 is journaled parallel to the succession of hoppers and is driven by the motor 56, to which it is connected by the pulleys 57 and 58 and belt 59. The bevel gears 60 are mounted on the shaft 55 and coact with the bevel gears 61, which are mounted at the outer ends of the transverse cam shafts 62 and by this arrangement the cams may be maintained constantly in alternative operating positions, thereby materially reducing the load on the motor.

In Fig. 12 the rear wall is shown in three reaches, 63, 64, and 65 and in this construction it will be seen that a greater slope is given to the upper reach 65 than to the middle reach 64, consequently a small log cannot force a larger log back into the hopper, thereby leaving the latter crowded with large logs, because the center vertical line through the small log 66 is on the hopper side as compared with the center vertical line through the larger log 67, which insures a constant push by the small log on the bigger log in the direction of the dividing platform or wall from the next hopper in succession.

The bracket 68 is here shown as operatively connected with the piston in the cylinder 76 for the return operation.

This mechanism is merely shown diagrammatically in the drawings and only briefly described, as it is not an essential feature in the invention.

The operation of the invention may be facilitated by relieving the hoppers of finished logs before reaching the delivery end and by doing this the efficiency may be greatly increased as smooth logs will not then interfere by delaying the contact of the bark covered logs with one another.

Various changes may be made in the construction of the machine without departing from the spirit of the invention, so long as said changes are within the scope of the claims for novelty following.

What I claim is:—

1. In a log barker and the like, a hopper having front and rear walls terminating in a slotted bottom portion and a driven rotatory member suitably journaled and in rotation entering the hopper through said slotted bottom portion and operating toward the rear wall.

2. In a log barker and the like, a hopper having front and rear walls terminating in a slotted bottom portion and a driven oscillatory member projecting through the slotted bottom and engaging the logs to keep them in a constant circulatory movement.

3. In a log barker and the like, a hopper having an opening at the lower rear end thereof, a driven shaft journaled adjacent to said opening, and a cam shaped member fixedly mounted on said shaft and entering said opening at each half revolution, and rolling the logs in contact therewith.

4. In a log barker and the like, a hopper having a plurality of openings at the lower rear end, a shaft suitably driven, and journaled adjacent to said opening, and cams mounted on said shaft and having log rolling faces receding from the direction of rotation and corresponding recesses on the inner sides, said cams entering said openings and engaging the logs in said hopper.

5. In a log barker and the like, a hopper having openings at the lower end of the rear wall in the bottom thereof, a water sprinkling device thereabove, and disturbing elements entering said openings and engaging the logs and creating a constant rolling movement and establishing a circulation of the logs in the hopper.

6. In a log barker and the like, a stationary hopper having a plurality of openings in the bottom, shaft bearings, a cam shaft journaled in said bearings and extending across the outside of said hopper adjacent to said openings, a gear on said shaft, pinion shaft bearings, a pinion shaft, a pinion coacting with said gear, a pulley and belt connection to said pinion shaft, a motor driving said pulleys, and a plurality of cams on said cam shaft engaging the logs in the hopper and rolling the same at each operation.

7. In a log barker and the like, a plurality of hoppers having openings in the bottoms at the lower end of the rear wall, disturbing elements entering said openings periodically and creating a regular and constant movement of the logs for rubbing purposes, a feeding platform, a sprinkling device over each hopper, connecting platforms between the several hoppers, and a runway from the last hopper.

8. In a log barker and the like, a succession of hoppers having openings in the bottoms at the lower ends of the rear walls, a driven shaft suitably journaled alongside said hoppers, transverse shafts suitably journaled and extending across said openings, bevel gears connecting said driven and transverse shafts, a motor operatively connected with said driven shaft, and cams mounted on said transverse shafts in alternatively operating positions respectively and in rotation entering said openings and engaging the logs.

9. In a log barker and the like, a hopper having a front sloping downwardly to the rear wall, the latter being formed in lower, middle and upper reaches, said upper reach having a greater inclination than said middle reach to facilitate the delivery of larger logs, and side walls closing in said front and rear walls, and means for agitating said logs.

10. In a log barker and the like, a hopper having an opening in the bottom at the lower end of the rear side forming flushing and cam slots, rotating cams extending through said slots for disturbing said logs at short intervals and automatic means for receiving and discharging the bark removed from the logs free of the accompanying water.

Signed at the city of Montreal, Quebec, Canada, this 21st day of March, 1919.

CARL BUSCH THORNE.